United States Patent [19]
Jordan et al.

[11] Patent Number: 5,402,922
[45] Date of Patent: Apr. 4, 1995

[54] COVER FOR A SPARE WHEEL

[75] Inventors: Hans-Peter Jordan, Schönaich; Christian Steinmetz, Stuttgart; Erich Rühringer, Magstadt; Heinz Hoger, Nufringen, all of Germany

[73] Assignee: Mercedes-Benz AG, Germany

[21] Appl. No.: 35,836

[22] Filed: Mar. 23, 1993

[30] Foreign Application Priority Data

Mar. 24, 1992 [DE] Germany .............. 42 09 404.6

[51] Int. Cl.$^6$ .............................................. B62D 43/00
[52] U.S. Cl. ................................ 224/42.2; 224/42.13; 206/304
[58] Field of Search ............... 224/42.2, 42.13, 42.06, 224/315, 42.25; 296/37.3; 206/304, 304.1.304.2

[56] References Cited

U.S. PATENT DOCUMENTS

| | | | |
|---|---|---|---|
| 2,039,786 | 5/1936 | Fergueson | 224/42.2 |
| 2,049,458 | 8/1936 | Lyon | 224/42.2 |
| 2,092,976 | 9/1937 | Jandus | 224/42.2 |
| 2,107,015 | 2/1938 | Short | 206/304 |
| 2,109,664 | 3/1938 | Fergueson | 224/42.2 |
| 4,214,683 | 7/1980 | Wills et al. | 224/42.2 |

FOREIGN PATENT DOCUMENTS 9109453.4 11/1991 Germany .

Primary Examiner—Henry J. Recla
Assistant Examiner—David J. Walczak
Attorney, Agent, or Firm—Evenson, McKeown, Edwards & Lenahan

[57] ABSTRACT

A cover for a spare wheel arranged externally at the rear of a motor vehicle has a clamping strap which covers the entire tread of the tire. In its lateral edge regions, the clamping strap is drawn in towards the center of the wheel. A round plate covers the free side of the wheel. Over the peripheral edge region of the plate, the drawn-in edge region of the clamping strap engages. In order to make such a cover easy to mount for a single person and to permit it to be used simultaneously for different tire widths, there is provided an outer, annular region of the plate bent to extend towards the spare wheel. A support body can be inserted into a vehicle-side receptacle as far as a stop. The support body is attached to the center of the rear of the plate. The length of the support body is dimensioned such that, when tightening the clamping strap, the plate, acting so to speak as a disc spring, presses the support body against its stop.

6 Claims, 2 Drawing Sheets

COVER FOR A SPARE WHEEL

BACKGROUND AND SUMMARY OF THE INVENTION

The invention relates to a cover for a spare wheel arranged externally at the rear of a motor vehicle, having a clamping strap which covers the entire tread of the tire and in its lateral edge regions is drawn in towards the center of the wheel. The cover also has a round plate which covers the free side of the wheel and whose peripheral edge region extends in a bent fashion towards the spare wheel and over which peripheral edge region the drawn-in edge region of the clamping strap engages.

A spare wheel cover of this kind is disclosed in the German Patent Document 91 09 453.4.

The known cover has, inter alia, the disadvantage that it can only be mounted in practice by two persons because holding the plate tight and simultaneous wrapping around and clamping the clamping strap can hardly be managed by one person alone. Furthermore, it is disadvantageous with the known cover that it can be used in practice only for one tire width.

The present invention is therefore based on the object of avoiding these disadvantages and providing a spare wheel cover which can be mounted simply and easily by only one person, which can be used for different tire widths and which is held tight and free of rattling in the mounted state.

This object is achieved according to the present invention by providing a cover that has an outer, annular region of the plate which extends in a bent manner towards the spare wheel. A support body can be inserted into a vehicle-side receptacle as far as a stop that is attached to the center of the rear of the plate. The length of the support body is dimensioned such that, when tightening the clamping strap, the plate, acting so to speak as a disc spring, presses the support body against its stop.

Other objects, advantages and novel features of the present invention will become apparent from the following detailed description of the invention when considered in conjunction with the accompanying drawings.

DETAILED DESCRIPTION OF THE DRAWINGS

Figure 1:
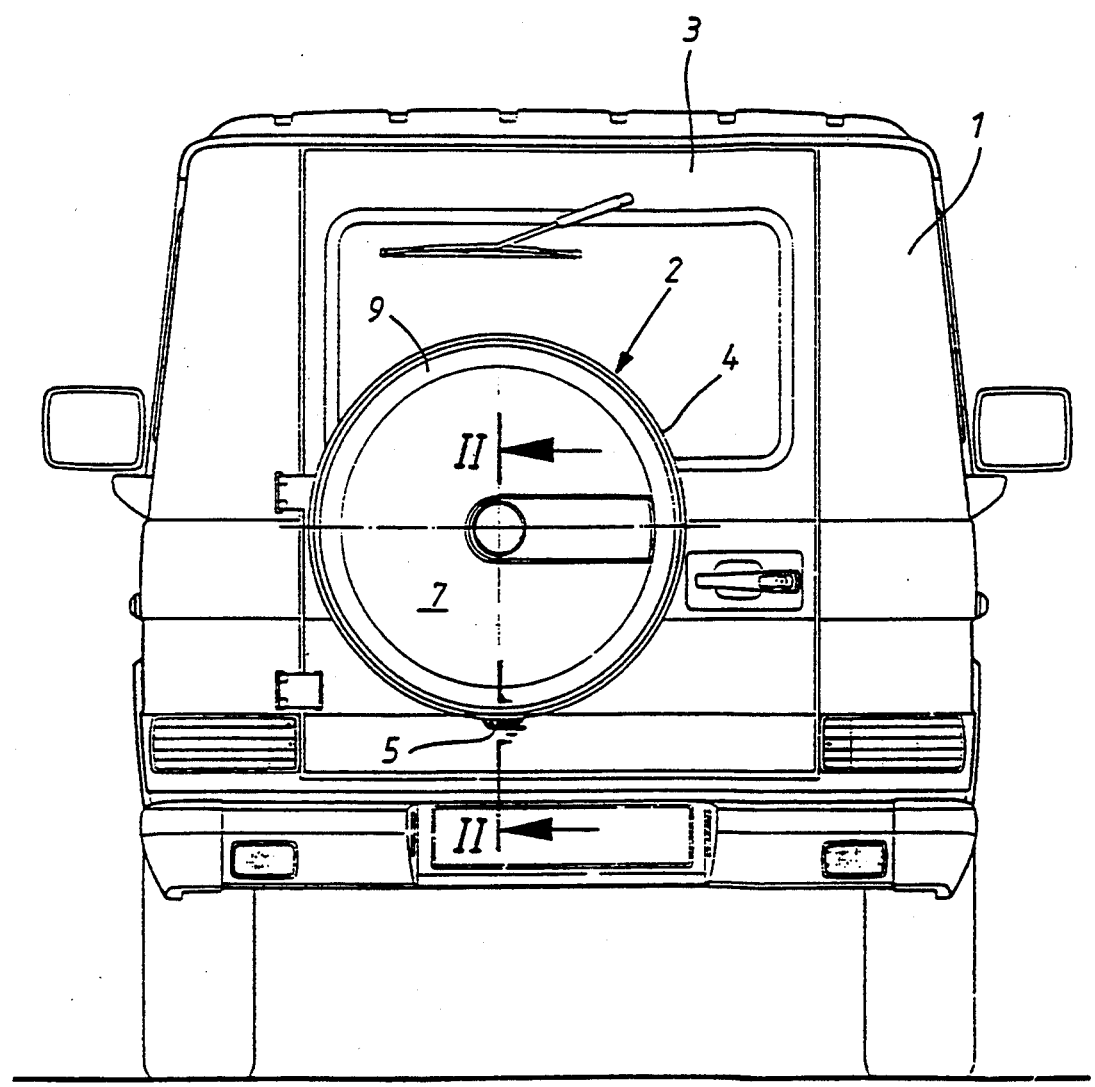
FIG. 1 is a rear view of an off-the-road vehicle with a spare wheel mounted thereon.

The off-the-road vehicle i shown in a rear view in FIG. 1 has a spare wheel 2 which is attached to the rear door 3 in a usual manner for vehicles of this kind.

The spare wheel 2 is provided with a cover which is to be described below in greater detail.

Figure 2:
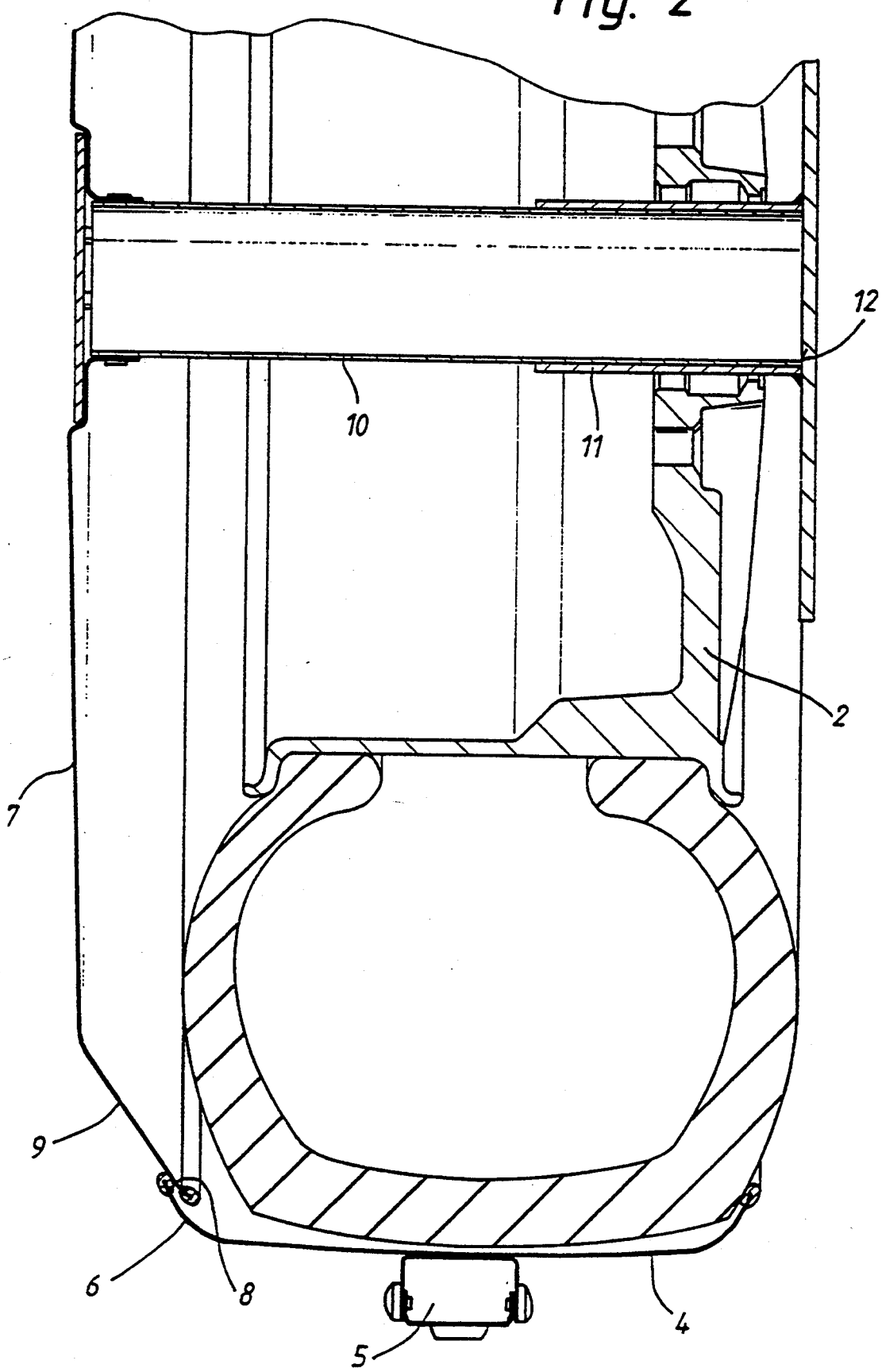
FIG. 2 is a larger scale view of a section taken along the line II—II in FIG. 1.

The cover has a clamping strap 4 which covers the entire tread of the tire and can consist, for example, of stainless steel. The clamping strap 4 is provided with a clamping lock 5 (not illustrated in greater detail). The lateral edge region 6 of the clamping strap 4 are drawn in towards the center of the wheel as shown in FIG. 2.

The free side of the spare wheel 2, when facing the viewer, is covered by a round plate 7 over whose peripheral edge region 8 the drawn-in edge region 6 of the clamping strap 4 engages when the cover is mounted.

The plate 7 is constructed in such a manner that an outer, annular region 9 extends in a bent manner towards the spare wheel 2 and that a support body in the form of a tube 10 which can be inserted into a vehicle-side receptacle 11 as far as a stop 12 is attached to the center of the rear of the plate 7. The length of this support body 10 is selected such that, when tightening the clamping strap 4, the plate 7, acting so to speak as a disc spring, presses the free end of the support body 10 against the stop 12. The support body is guided in the receptable 11 is secured against rotation.

It is therefore simple for only one person to mount the cover according to the present invention. The support body 10 must simply be pushed into its receptacle 11 and the clamping strap 4 then placed over it and tensioned.

In addition, the cover can be used independently of the tire width of the spare wheel. It must simply be ensured that sufficient space is available for the largest possible tire width.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cover for a spare wheel, having a tire with a tread, arranged externally at a rear end of a motor vehicle, the cover comprising:

a clamping strap entirely covering the tread of the tire, said clamping strap being drawn inward at a lateral edge region toward a center of the wheel;

a plate, having an outer annular region extending in a bent manner towards the spare wheel, covering a free side of the wheel, the plate having a peripheral edge region over which the drawn inward lateral edge region of the clamping strap engages;

a support body attached to a center region of the plate facing said wheel;

a vehicle-side receptacle and a stop, separate from said wheel and tire, the support body being insertable into the receptacle as far as the stop;

wherein the support body's length is dimensioned such that, when the clamping strap is tightened, the plate presses the support body against the stop.

2. A cover according to claim 1, wherein the plate presses the support body against the stop in a disc-spring type manner.

3. A cover according to claim 1, wherein the support body is guided in the receptacle secured against rotation.

4. A method for covering a spare wheel and tire, having a tread, arranged externally at a rear end of a motor vehicle, the method comprising the steps of:

inserting a support body, coupled at one end to a plate having an outer, annular region bent inward, into a receptacle on the rear end of the vehicle so as to cover a free side of the wheel with the plate;

entirely covering the tread of the motor vehicle with a clamping strap having a drawn inward lateral region which engages over a peripheral edge region of the outer, annular region of the plate; and tightening the clamping strap so as to press the support body against a stop in the receptacle.

5. A method according to claim 4, wherein the step of inserting includes the step of guiding the support body into the receptacle in a manner secured against rotation.

6. A method for covering a spare wheel and tire, having a tread, arranged externally at a rear end of a motor vehicle, the method comprising the seeps of:
inserting a support body, coupled at one end to a plate having an outer, annular region bent inward, into a receptacle on the rear end of the vehicle separate from the wheel and tire so as to cover a free side of the wheel with the plate;
entirely covering the tread of the motor vehicle with a clamping strap having a drawn inward lateral region which engages over a peripheral edge region of the other, annular region of the plate; and
tightening the clamping strap so as to press the support body against a stop in the receptacle.

* * * * *